United States Patent
Barron

(10) Patent No.: US 11,179,001 B2
(45) Date of Patent: Nov. 23, 2021

(54) CASSETTE MADE OF PLASTIC HAVING A HEATING DEVICE

(71) Applicant: Syntegon Pouch Systems AG, Beringen (CH)

(72) Inventor: Dan Barron, Schaffhausen (CH)

(73) Assignee: Syntegon Pouch Systems AG, Beringen (CH)

(*) Notice: Subject to any disclaimer, the term of this patent is extended or adjusted under 35 U.S.C. 154(b) by 383 days.

(21) Appl. No.: 16/331,595

(22) PCT Filed: Jul. 19, 2017

(86) PCT No.: PCT/EP2017/068205
§ 371 (c)(1),
(2) Date: Mar. 8, 2019

(87) PCT Pub. No.: WO2018/050328
PCT Pub. Date: Mar. 22, 2018

(65) Prior Publication Data
US 2019/0357725 A1    Nov. 28, 2019

(30) Foreign Application Priority Data

Sep. 13, 2016   (DE) ..................... 10 2016 217 375.8

(51) Int. Cl.
*A47J 36/24* (2006.01)
*H05B 1/02* (2006.01)
(Continued)

(52) U.S. Cl.
CPC ........ *A47J 36/2483* (2013.01); *H05B 1/0269* (2013.01); *H05B 3/32* (2013.01);
(Continued)

(58) Field of Classification Search
None
See application file for complete search history.

(56) References Cited

U.S. PATENT DOCUMENTS

| 5,490,613 A | 2/1996 | Taylor et al. |
| 6,003,733 A | 12/1999 | Wheeler |

(Continued)

FOREIGN PATENT DOCUMENTS

| AU | 2002308292 B2 | 5/2007 |
| CN | 1296394 A | 5/2001 |

(Continued)

OTHER PUBLICATIONS

International Search Report for Application No. PCT/EP2017/068205 dated Oct. 9, 2017 (English Translation, 2 pages).

*Primary Examiner* — Joseph M. Pelham
(74) *Attorney, Agent, or Firm* — Michael Best & Friedrich LLP

(57) ABSTRACT

In order to heat a bag filled, for example, with a food product to a predeterminable temperature, the entire cassette (1) has been heated in the past. The invention relates to a cassette (1) made of plastic, wherein in each of the cassette shells (2, 3) a receiving recess (10) is formed, in each of which a respective heat-conducting plate (11) is arranged securely in position. A heating element (20) is applied to the heat-conducting plate (11) and the heat-conducting plate (11) is retained in an insulated manner on the respective cassette shell (2, 3) such that a thermal insulating air gap remains between the heat-conducting plate (11) or the heating element (20) and the cassette shell (2, 3).

15 Claims, 3 Drawing Sheets

(51) Int. Cl.
   *H05B 3/32* (2006.01)
   *H05B 3/34* (2006.01)
(52) U.S. Cl.
   CPC ......... *H05B 3/34* (2013.01); *H05B 2203/013* (2013.01); *H05B 2203/028* (2013.01); *H05B 2203/035* (2013.01)

(56) References Cited

U.S. PATENT DOCUMENTS

| | | |
|---|---|---|
| 6,938,801 B1 | 9/2005 | Reddy et al. |
| 10,524,615 B2 * | 1/2020 | Reales Bertomeo ........................ A47J 37/0641 |
| 2002/0081109 A1 * | 6/2002 | Mitsunaga .............. A61M 5/44 392/470 |
| 2002/0092838 A1 | 7/2002 | Bostic et al. |
| 2002/0092879 A1 | 7/2002 | Chrisman et al. |
| 2002/0179642 A1 * | 12/2002 | Gutierrez ............. B67D 3/0029 222/146.1 |
| 2003/0116584 A1 * | 6/2003 | Gutierrez ................ B67D 7/80 222/1 |

FOREIGN PATENT DOCUMENTS

| | | | |
|---|---|---|---|
| DE | 19807388 | 9/1999 | |
| WO | WO-2011015912 A1 * | 2/2011 | ............ A61M 5/148 |

* cited by examiner

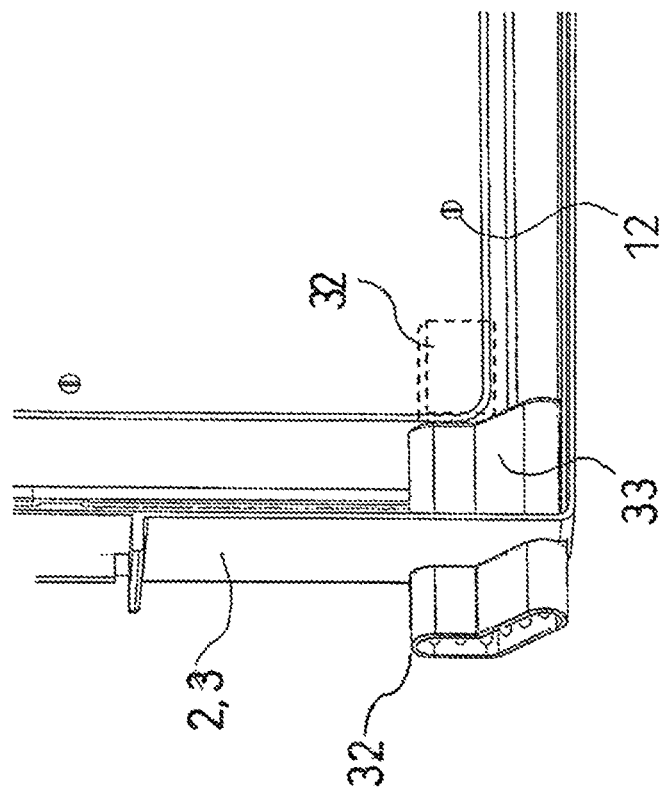
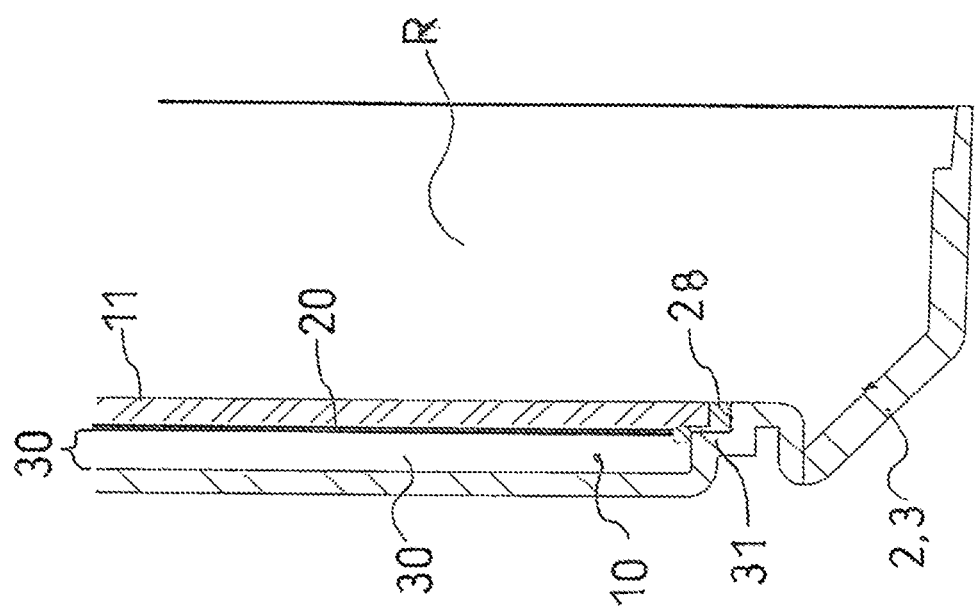

CASSETTE MADE OF PLASTIC HAVING A HEATING DEVICE

BACKGROUND OF THE INVENTION

The present invention relates to a cassette or cartridge having a heating device made from plastics material having at least two detachably connectable cartridge shells, wherein a bag, in particular a bag with a foodstuff, can be received in the cartridge, wherein the two cartridge shells are connectable, preferably connected to one another in a jointed manner.

Various liquid or semi-liquid foodstuff products, in some cases with added solid constituents, must be heated before being dispensed in doses and be held at a specified temperature during the dispensing procedure. In this case, only solutions in which these foodstuffs are supplied in flexible bags and heated in a corresponding dispensing device are of interest here. In this case, the foodstuff is heated in the flexible bag itself. The flexible bags are either inserted into chambers having heatable walls or incorporated in cartridges and heated in these cartridges.

In many cases, the flexible bags, which are manufactured from plastics films, have been preheated before being inserted in a corresponding dosing device or before being inserted in cartridges which are replaceably inserted into these dosing devices. The present invention aims to avoid this preheating process outside a dosing device.

In the previously known systems, these dosing devices have compartments into which either cartridges can be introduced, in which the corresponding filled bags to be heated can be placed, or in which the corresponding bags are accommodated directly in these compartments. In all solutions, the two mutually opposing walls either of a compartment or the two opposing heated walls are formed by a bottom shell and a top shell of a cartridge in each case. Accordingly, such cartridges are hitherto preferably made from metal or at least made mostly from metal. According to the prior art, heating takes place mostly by forming channels in these walls, through which water which is heated accordingly is circulated or hot air is blown. A third variant provides that corresponding heating wires are laid in these channels in order to heat these plate-shaped walls accordingly. In all these variants, the entire cartridge is heated to relatively high temperatures and, with this, a high volume of material is heated, which then acts on the bag held between these walls and its contents. This is inefficient, uneconomical and unecological since a lot of unnecessary energy is used. Furthermore, the entire heating process is also very slow owing to the high volume of material which must be heated to a required temperature.

When the entire bag is emptied and a new filled bag is to be inserted into the corresponding cartridge, the entire cartridge is accordingly very hot and, accordingly, minor burns to the operating personnel occur on a relatively frequent basis.

SUMMARY OF THE INVENTION

It is the object of the present invention to improve a heatable cartridge of the type mentioned at the outset such that the problems mentioned are reduced. This object is achieved by a thermally heatable cartridge made from plastics material of the type mentioned at the outset, which is notable in that, in each cartridge shell, a receiving recess is formed, which extends in each case over at least half the width and over at least half the height of the corresponding cartridge shell, and wherein a heat-conducting plate is received in the receiving recess in a positionally secured manner, which heat-conducting plate comprises a metal plate to which a heating element is applied on the side which is remote from the bag receiving space in the assembled state, and in that a thermally insulating air gap is defined between the heat-conducting plate and the respective cartridge shell in the region of the receiving recess. To achieve the appropriate effect, this thermally insulating air gap must be of a certain size. The air gap will preferably be configured to be the same size as, or greater than, the thickness of the heat-conducting plate. Assuming that the heat plate is normally 1 to 2 mm, the air gap should therefore be at least this size, although it should preferably be approximately 1.5 to 4 mm.

To achieve a sufficient air gap of this type without increasing the overall size of the cartridge and therefore also the overall size of a dispensing device in which such cartridges are received, it is required that the heating element as a whole can be configured to be as flat as possible. This is preferably achieved in that the heating element, which is applied to the heat-conducting plate, is manufactured from a flexible thermofilm having heat-conducting paths formed in an etching technique, wherein this thermofilm is held in a sheath comprising two mutually connected heat-resistant plastics films. Since such heat-resistant plastics films are also electrically insulating, this serves to ensure that the electrically conductive elements are protected even in the event of moisture making its way into the region of the heating element. In addition, such a heating element is extremely thin and, even including the sheath comprising a heat-resistant plastics film, only has a total thickness of several tenths of a mm. At the same time, a temperature monitoring element will preferably also be attached to such a thermofilm.

It is particularly advantageous if the receiving recesses in the two cartridge shells have a circumferential, inwardly projecting supporting step which is offset accordingly downward toward the corresponding cartridge shell wall in the receiving recess by at least the thickness of the of the heat-conducting plate supported on it. An absolutely flush plane can thus be formed, comprising the heat-conducting plate on the one hand and, on the other, the cartridge shell wall above in this receiving recess so that a rubber-elastic coated emptying roller is able to roll over this plane without resistance.

In this configuration, it is moreover expedient if a rubber-elastic sealing strip surrounds the heat plate and seals the bag receiving space with respect to the receiving recess. It is thus moreover prevented that the heat-conducting plate is in direct heat-conducting contact with the cartridge wall, which means that the cartridge itself is heated only slightly as a result of waste heat radiation. This guarantees that the inventive, thermally heatable cartridge is heated only slightly but, moreover, the risk of burns is practically fully prevented when the cartridge is removed and a new filled bag is inserted.

In addition, the heat-conducting plate extends merely over a little more than the lower half of the cartridge and is only in direct contact with the tubular bag. The upper region, in which the bag is replaceably held and where the actual manipulation takes place, is therefore relatively far away from the heat-conducting plate and there is no risk of burns here in this region.

BRIEF DESCRIPTION OF THE DRAWINGS

A preferred exemplary embodiment of the subject matter of the invention is illustrated in the accompanying drawing and explained with reference to the description below.

FIG. 3 shows a partial section through a cartridge shell in the region with the hinge removed, in a vertical section to explain the mounting of a heat-conducting plate in one of the two cartridge shells, whilst FIG. 4 shows a perspective partial section of a cartridge shell in the lower region with an inserted cable bushing connector.

DETAILED DESCRIPTION

Figure 1:
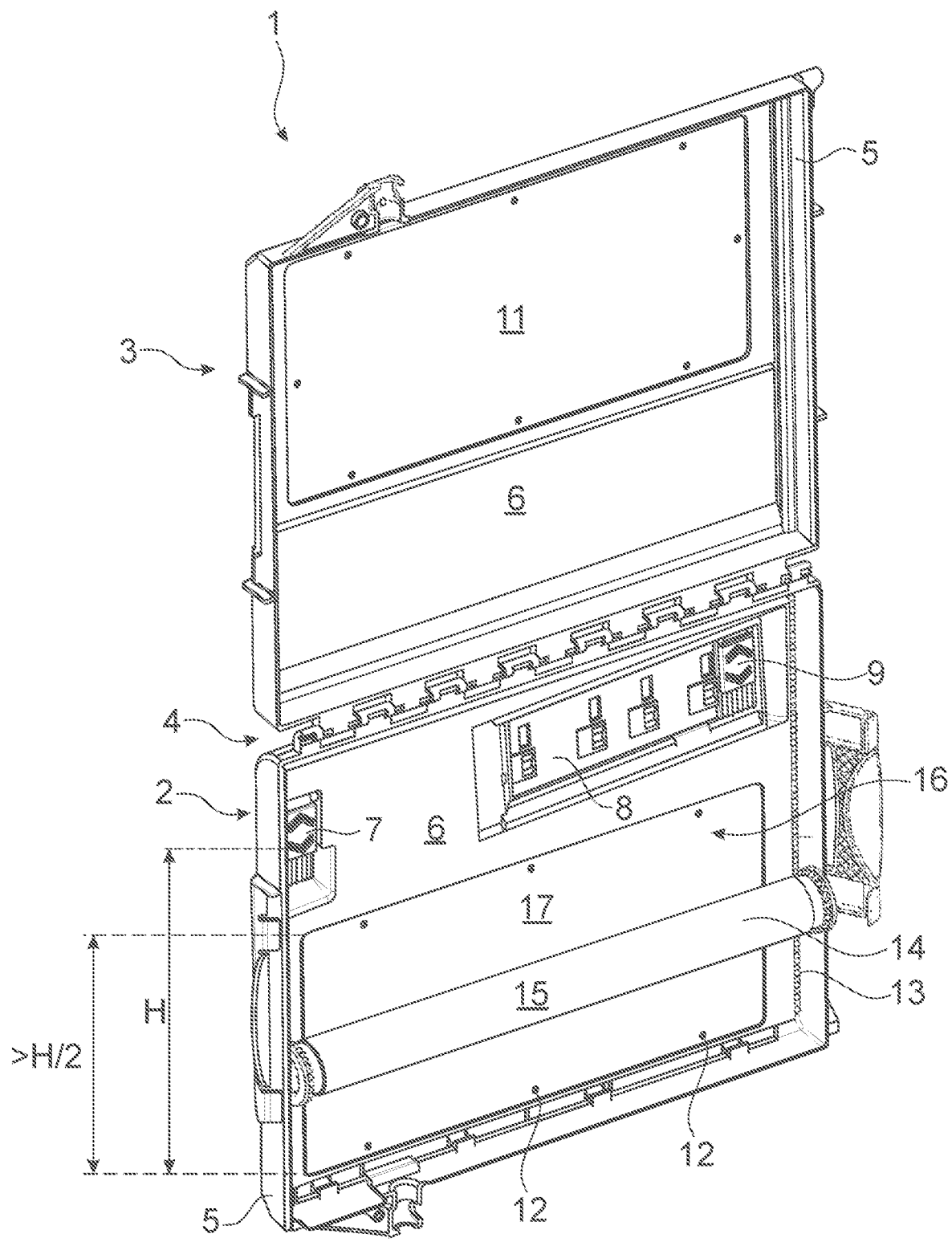
FIG. 1 shows a perspective overall view of a fully opened heatable cartridge in the assembled state, omitting the bag to be heated.

In FIG. 1, the fully assembled heatable cartridge 1 can be seen in a fully opened state. Such a cartridge comprises two cartridge shells 2, 3, wherein the lower cartridge shell in the figure forms the cartridge bottom shell 2 and the cartridge shell illustrated at the top in the drawing shows the cartridge top shell 3. The two cartridge shells 2, 3 are connected to one another via a hinge 4. In principle, the individual cartridge shells can also be connected to one another without a hinge in that they can be simply plugged together or can be connected to one another in another manner. However a hinge connection between the two cartridge shells is particularly suitable for simple handling of the heatable cartridge. Each cartridge shell 2, 3 has a flat wall portion 6 in the region close to the hinge, which wall portion forms part of the supporting surface of a bag receiving space R. Means for the suspended mounting of a tubular bag to be emptied are shown in the cartridge bottom shell 2. These means comprise a fixedly arranged bag clamp 7 and a clamping rail 8, which extends at a slight angle to the extent of the hinge 4 and on which an adjustable bag clamp 9 can be attached at various points.

Each cartridge shell 2, 3 possesses a receiving recess 10, which can be seen only indirectly here since the receiving recess 10 is covered by a heat-conducting plate 11. In this position, the heat-conducting plate 11 is held flush with the flat wall portion 6 of the bag receiving space R by means of countersunk screws 12 and thus forms a perfect rolling plane. This flush alignment of the heat-conducting plate 11 with the flat wall portion 6 is required when the cartridge is equipped with an emptying roller. Such an emptying roller runs on two parallel toothed racks 13, which are integrally formed in the cartridge bottom shell 2. The emptying roller 14, which merely moves downward in the cartridge under the effect of gravity, possesses a rubber-elastic coating 15, preferably made from a foamed polyurethane. In the cartridge top shell 3, it can clearly be seen how, overall, the flat wall portion 6 of the bag receiving space R forms a planar bag guiding surface 16 together with the surface of the heat-conducting plate 11. The actual bag receiving space R is formed half by the cartridge bottom shell 2 and half by the cartridge top shell 3. This bag receiving space R can be seen most clearly in FIGS. 2 and 3, wherein it goes without saying that always only half of the bag receiving space can be seen here.

Figure 2:
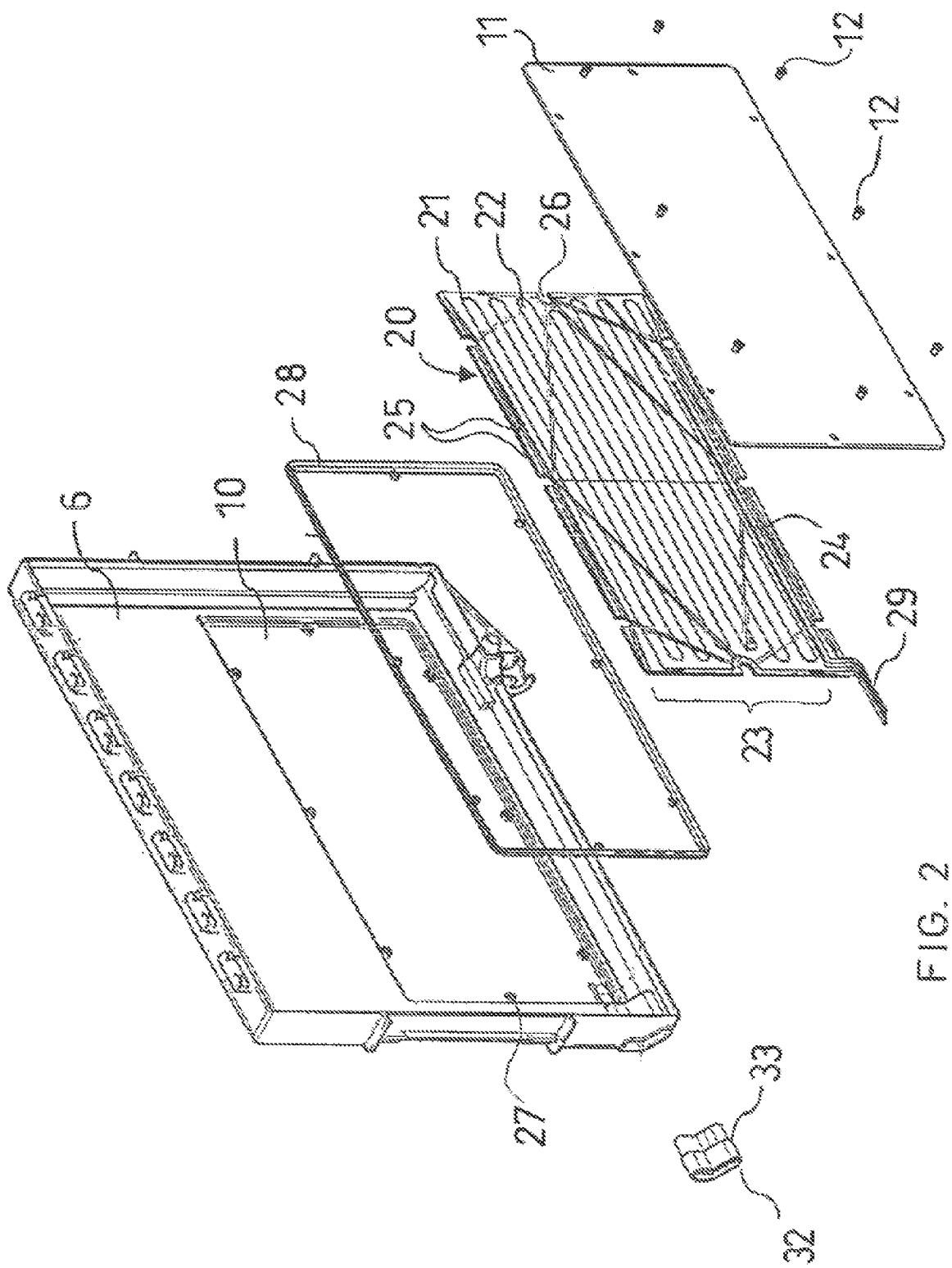
FIG. 2 shows an exploded drawing of a cartridge shell with the various components indicated herein.

In FIG. 2, a cartridge top shell 3 and the components accommodated therein are illustrated in an exploded illustration so that they can be seen individually. In the assembled state, only the heat-conducting plate 11 located in the receiving recess 10 can be seen. This heat-conducting plate 11 comprises a metal plate with good heat-conducting properties; to this end, an aluminum plate is particularly suitable since, on the one hand, it does not corrode and, on the other, it ensures that the heatable cartridge as a whole does not become unnecessarily heavy. On the surface which is directed toward the bag receiving space R in the assembled state, the heat-conducting plate 11 possesses a coating 17 made from a high-temperature-resistant plastics material. This coating prevents the plastics bag to be heated, with the contents to be dispensed in doses, from being able to stick to the heat-conducting plate 11. This would be conceivable because various plastics bags which are commercially used today have a relatively low softening temperature of approximately 70-100° C. A heat-conducting plate 11 with a PTFE coating is accordingly particularly suitable.

The actual heating element is denoted as a whole by 20. It comprises a flexible thermofilm 21, on which heat-conducting paths 22, formed in an etching technique, are arranged. In the embodiment illustrated here, these heat-conducting paths 22 extend in a meandering manner over the entire surface of the flexible thermofilm 21. These heat-conducting paths 22 define a heating zone 23. In the embodiment illustrated here only a single heating zone 23, which extends over the entire flexible thermofilm, is indicated. However, this heating zone can preferably also be divided into three different heating zones. In this case, the single heating zone 23 illustrated in FIG. 2 is then subdivided into three heating zones extending above one another, at least virtually without gaps, over the entire width of the thermofilm 21. It goes without saying that such a solution only makes sense if the heat-conducting plate is also divided into thermally separate sub-plates. Therefore, each individual heating zone 23 can be switched on or off with thermal monitoring. For example, if a bag in the bag receiving space is already half empty, it makes little sense to continue to heat the upper empty region of the bag.

A thermistor 24 can also be attached to the flexible thermofilm 21. The temperature of the heat-conducting plate can be monitored by means of such a thermistor 24. Such a thermistor 24 can be switched so that it switches off the heat-conducting path 22 when a certain temperature is reached and switches it back on again when the temperature falls below a second temperature. It is thus ensured that the product to be heated in the bag to be emptied is in the desired temperature range.

The extremely thin and flexible thermofilm 21 is accommodated in a case-like sheath 25. This sheath 25 is then closed on all sides for safety reasons, for example by sealing, and this case-like sheath 25 is finally bonded to the heat-conducting plate with full-surface adhesion. In this case, peripheral cutouts 26 are present in the case-like sheath 25, which enable the countersunk screws 12 to be guided through the heat-conducting plate 11 and into corresponding blind holes in the cartridge top shell 3. These blind holes are visible in FIG. 2 and are denoted by 27. The heat-conducting plates 11 with the flexible thermofilm applied thereto in the case-like sheath 25 are then surrounded by a rubber-elastic seal 28, which in turn possesses corresponding eyes 29 through which the countersunk screws 12 mentioned above are guided. In the cartridge top shell 3 illustrated in its own right in FIG. 2, the receiving recess 10 is openly visible. In pre-assembly, the heat-conducting plate 11 is firstly coated with a non-stick coating 17, the flexible thermofilm 21 with the electrical connections 29 is then introduced into the case-like sheath 25, the electrical cables 29 are guided out here and this sealed case is then bonded over its full surface to the side of the heat-conducting plate 11 which is remote from the non-stick coating 17. A rubber-elastic seal 28 reaching around the heat-conducting plate is finally fitted and placed in the receiving recess 10 in a positionally stable manner, wherein means are present which hold the heat-conducting plate, including the heating element 20, in the receiving recess 10 so that the entire heat-conducting plate 11 with the heating element 20 is held in the cartridge in such a way that it is not in direct contact with the cartridge. Only the edge regions of the heat-conducting plate 11 are in indirect contact with the corresponding cartridge shell 2, 3 via the thermally insulating rubber-elastic seal 28. Accordingly, a heat-insulating air gap 30 remains between the heat-conducting plate 11 and the cartridge shell 2, 3 in the receiving recess 10 between the heat-conducting plate 11 and the cartridge shell 2, 3. The air gap therefore refers to the distance between the heat-conducting plate 11 and the wall of the corresponding cartridge shell in the region of the receiving recess 10. Overall, this air gap is preferably the same size as, or greater than, the thickness of the heat-conducting plate 11 including the heating element 20. If it is assumed that the heat-conducting plate preferably has a thickness of 1 to 2.5 mm, it can therefore be assumed that the size of the air gap is at least 1 to preferably approximately 5 mm. The heat-conducting plate 11 must therefore be held such that it is supported in the correct vertical position in the receiving recess of the cartridge shell 2, 3. As shown by the solution in FIG. 2, this can take the form of cylindrical raised portions in which the mentioned blind holes are arranged for screw-connecting the heat-conducting plate 11 to the corresponding cartridge shell 2, 3 by means of the countersunk screws 12.

Alternatively, however, this can also be realized such that a circumferential inwardly projecting supporting step 31 is present in the receiving recess 10 of the respective cartridge shell 2 or 3. With respect to that flat wall portion 6 of the bag receiving space R, this circumferential supporting step 31 is offset into the receiving recess by the thickness of the heat-conducting plate 11 including the heating element 20, as is clearly shown in FIG. 3. The coated surface of the heat-conducting plate 11, which is directed toward the bag receiving space R, thus forms an overall flush supporting surface for the filled bag, which is received accordingly in the cartridge and is to be emptied in doses, whilst maintaining a specified temperature. This temperature is preferably between 60 and 80° C.

In addition to the mentioned option of a thermistor 24, it goes without saying that another form of temperature monitoring element can also be actively connected to the thermofilm. This can be one or more temperature sensors, by means of which the heat-conducting plate can be heated to a predetermined temperature range and held in this desired temperature range. Again, it goes without saying that other temperature monitoring elements can also be considered. The person skilled in the art will select the expedient solution for each corresponding temperature range.

A corresponding connector will normally be attached to the electrical connections 29 guided out of the case-like sheath. This connector 32, as illustrated in FIG. 4, can then be introduced into a connector bushing, which is integrally formed in, or pushed into, the cartridge shells 2, 3 in corresponding bushing openings, and connected to a corresponding mating connector from the other side in the region of the connector bushing 33. From there, the cables can lead to a corresponding supply, regulating and monitoring unit. However, these parts are not parts of the cartridge, but of the dosing device in which the heatable cartridge is held. The electrical connections 29 will preferably be guided as a bundle in a flat cable from the region of the air gap into the region of the connector bushing 33.

LIST OF REFERENCE SIGNS

1 Heatable cartridge
2 Cartridge bottom shell
3 Cartridge top shell
4 Hinge
5 Circumferential edge
6 Flat wall portion of the bag receiving space
7 Bag clamp, fixed
8 Clamping rail
9 Bag clamp, adjustable
10 Receiving recess
11 Heat-conducting plate
12 Countersunk screw
13 Toothed racks
14 Emptying roller
15 Rubber-elastic coating
16 Bag guiding surface
R Bag receiving space
17 PTFE coating (nonstick coating)
20 Heating element
21 Flexible thermofilm
22 Heating conductor paths formed in an etching technique
23 Heating zone
24 Thermistor
25 Case-like sheath
26 Peripheral cutouts
27 Blind holes in cartridge shell 2, 3
28 Rubber-elastic seal
29 Electrical connection
30 Air gap
31 Circumferential supporting step
32 Connector
33 Connector bushing

The invention claimed is:

1. A cartridge (1) made from plastics material having a heating device having at least two detachably connectable cartridge shells (2, 3), the cartridge having a bag receiving space (R) configured to receive a bag, wherein the two cartridge shells (2, 3) are configured to be connected, wherein, in each cartridge shell (2, 3), a respective receiving recess (10) is formed, which extends over at least half a width and over at least half a height (H) of said each cartridge shell (2, 3), and wherein a heat-conducting plate (11) is arranged in the receiving recess in a positionally secured manner, which heat-conducting plate comprises a metal plate to which a heating element (20) is applied on a side which is remote from the bag receiving space in an assembled state, and wherein a thermally insulating air gap (30) is defined between the heat-conducting plate (11) and a respective cartridge shell (2, 3) in a region of the receiving space (R).

2. The cartridge as claimed in claim 1, characterized in that the air gap (30) is the same size as, or greater than, a thickness of the heat-conducting plate (11).

3. The cartridge as claimed in claim 1, characterized in that the heating element (20) which is applied to the heat-conducting plate (11) comprises a flexible thermofilm (21) having heat-conducting paths (22), wherein the thermofilm (21) is held in a case-like sheath (25) comprising two mutually connected heat-resistant plastics films.

4. The cartridge as claimed in claim 3, characterized in that a temperature monitoring element is connected to the thermofilm (21).

5. The cartridge as claimed in claim 4, characterized in that the temperature monitoring element is a thermistor (24) or a thermal switch.

6. The cartridge as claimed in claim 3, characterized in that all electrical connections (29) from and to the heating element (20) are guided as a bundle in a flat cable in a region of the air gap (30) and are guided out of the heatable cartridge by a connector pair (32, 33) passing through a cartridge wall.

7. The cartridge as claimed in claim 6, characterized in that the connector pair passing through the cartridge wall is manufactured integrally with each cartridge shell in an injection molding technique.

8. The cartridge as claimed in claim 1, characterized in that the receiving recesses (10) in the cartridge shells (2, 3) have a circumferential, inwardly projecting supporting step (31) which is offset accordingly downward toward a cartridge shell wall in the receiving recess (10) by at least a thickness of the of the heat-conducting plate (11) supported on the cartridge shell wall.

9. The cartridge as claimed in claim 1, characterized in that a rubber-elastic seal (28) surrounds the heat-conducting plate (11) and seals the bag receiving space (R) with respect to the receiving recess (10).

10. The cartridge as claimed in claim 1, characterized in that a rubber-elastic-coated (15) emptying roller (14) is arranged in the heatable cartridge, which emptying roller rolls under the effect of gravity onto an already partially emptied bag and presses residues in the bag downward to an emptying side, wherein a surface (16) of the cartridge shell (2, 3) over which the emptying roller moves and the heat-conducting plate (11) covering the receiving recess (10) are located in the same plane.

11. The cartridge as claimed in claim 1, characterized in that the heat-conducting plate (11) is provided with a high-temperature-resistant plastics coating (17) on a surface directed toward the bag receiving space (R) in the assembled state, which plastics coating prevents the plastics bag from sticking.

12. The cartridge as claimed in claim 11, characterized in that the coating (17) of the heat-conducting plate (11) comprises TPFE.

13. The cartridge as claimed in claim 1, characterized in that the cartridge shells (2, 3) are connected to one another in a hinge-jointed manner (4) and the receiving recesses (10) therein extend upward from an end remote from the hinge to over half the height (H) of the cartridge shells (2, 3), and that the cartridge further comprising suspension means (7, 9) for the bag on one cartridge shell (2, 3) in a region close to the hinge.

14. The cartridge (1) as claimed in claim 1 wherein the bag receiving space (R) is configured to receive a bag with a foodstuff, and wherein the two cartridge shells (2, 3) are configured to be connected to one another in a jointed manner.

15. The cartridge as claimed in claim 1, characterized in that the heating element (20) which is applied to the heat-conducting plate (11) comprises a flexible thermofilm (21) having heat-conducting paths (22) which are formed in an etching technique, wherein the thermofilm (21) is held in a case-like sheath (25) comprising two mutually connected heat-resistant plastics films.

\* \* \* \* \*